Patented Jan. 6, 1925.

1,521,967

UNITED STATES PATENT OFFICE.

LUTHER C. POWERS, OF KNOXVILLE, TENNESSEE.

MANUFACTURE OF MORTAR FOR BRICKLAYING.

No Drawing.   Application filed October 26, 1922.   Serial No. 597,180.

*To all whom it may concern:*

Be it known that I, LUTHER C. POWERS, a citizen of the United States, residing at Knoxville, in the county of Knox and State of Tennessee, have invented a new and useful Improvement in the Manufacture of Mortar for Bricklaying, of which the following is a specification.

My improvement relates particularly to a mortar mixture of materials in dry form and adapted to become a mortar by the addition of water.

The object of the invention is to produce such a mixture which shall be adapted to become a mortar well suited for the laying of brick in brick walls and other situations. Such a mortar should, after setting, be strong and durable against the action of the elements, and it should have uniform texture, and it should not contract or shrink during or after setting.

Preparing this mixture in dry form has advantage, because large quantities can be prepared with the same proportions of ingredients, whereby uniformity of quality is attained, and small or large quantities of the mixture can then be transported and converted into mortar at the convenience of the brick layers.

The ingredients of my improved mixture are as follows:

Four parts of sharp, clean river sand, thoroughly dried, preferably in a rotary drier;

One part of clay, chemical analysis of which is given below, said clay being thoroughly dried and pulverized;

Two parts pulverized lime stone thoroughly dried;

One part Portland cement.

The analysis of the above-mentioned clay is as follows:

|   | Per cent. |
|---|---|
| Silica | 69.40 |
| Iron oxide | 6.48 |
| Alumina | 13.52 |
| Manganese | Trace |
| Lime | .34 |
| Magnesia | .81 |
| Loss on ignition | 7.56 |
| Alkalis (dif.) | 1.89 |

On burning, this clay becomes several shades darker in color, but it shows comparatively little contraction.

These several materials are to be mechanically mingled or mixed with each other in substantially the above-mentioned proportions, the materials being heated before the mixing operation is begun and the heat being maintained during the mixing operation. The mixing is preferably done by means of mixing machines adapted to separately hold masses of the several materials and deliver from each mass the required proportion into a compartment in which the united mass is sufficiently agitated to effect complete intermingling of the several materials.

In the above operation, before the mixing, the pulverized lime stone should be heated to about 1200 degrees (Fahr.) to thoroughly dry, but not enough to burn into lime.

The clay has the quality indicated by the above noted analysis and the above statement that, on burning, this clay shows several shades darker in color, but it shows comparatively little contraction. Such a clay is plastic and in the finished product this clay is fire-proof. Ordinary clays will not answer for this operation. Before being put into the mixture, this clay should be subjected to a drying heat of about 900 degrees (Fahr.).

As above stated, heating of the several materials is maintained during the mixing operation, such heating being for the purpose of further drying the materials.

As above stated, the object of my invention is to produce a dry mixture adapted to form a mortar well suited for use in brick laying. Through long experience in brick laying and in other work involving the use of mortar, I have learned that for brick laying there is need of a mortar having special qualities not needed in mortar used for other purposes, for example, the various kinds of wall plastering.

I claim as my invention:

1. The herein described method of forming a dry mortar mixture for brick laying, which method consists in heat-treating for drying pulverized lime stone and sand and clay of substantially the kind herein described, and mechanically combining and intermingling four parts of said sand, one part of said clay, two parts of said pulverized lime stone, and one part of Portland cement, said ingredients being heated for drying during the progress of the mixing, substantially as described.

2. As an article of manufacture, a dried mortar mixture comprising substantially four parts of dried sand, two parts of dried pulverized lime stone, one part of dried clay of substantially the kind herein described, and one part of Portland cement, substantially as described.

In testimony whereof I have signed my name, this 23rd day of October, in the year one thousand nine hundred and twenty-two.

LUTHER C. POWERS.